Oct. 11, 1966　　　C. G. HAKENSON　　　3,277,844
SECURING DEVICE
Filed Feb. 4, 1964
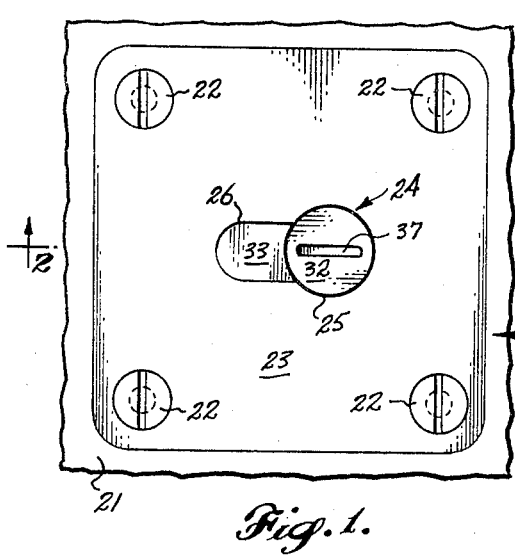
Fig. 1.
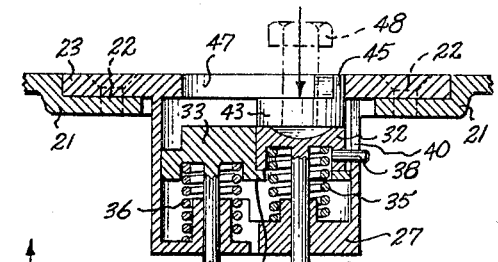
Fig. 7.
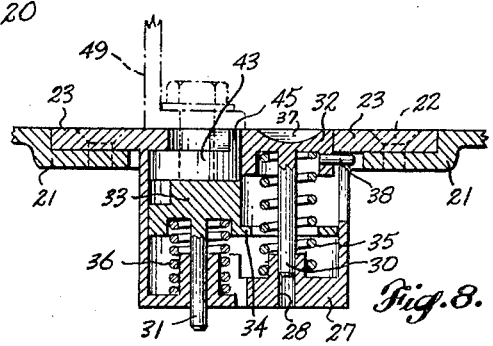
Fig. 8.
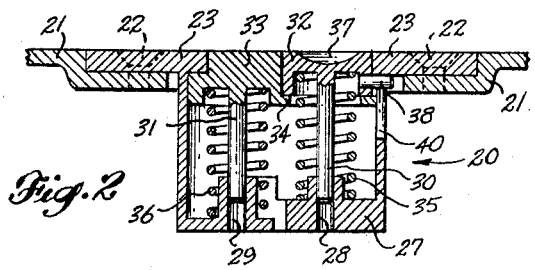
Fig. 2.
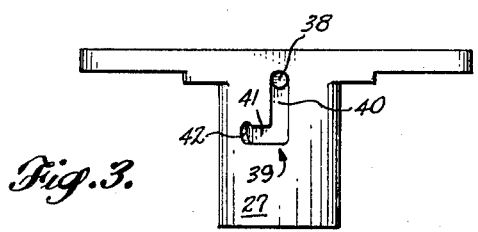
Fig. 3.
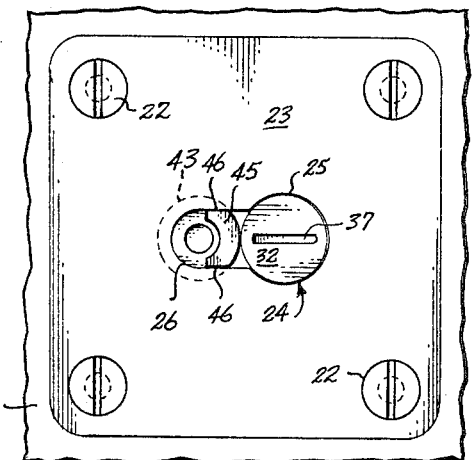
Fig. 9.
Fig. 6.
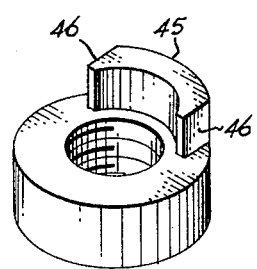
Fig. 4.
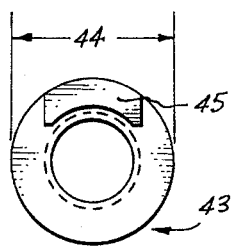
Fig. 5.
INVENTOR.
CARROLL G. HAKENSON
BY
Erwin F. Adams
ATTORNEY

United States Patent Office 3,277,844
Patented Oct. 11, 1966

3,277,844
SECURING DEVICE
Carroll G. Hakenson, Kent, Wash., assignor to The Boeing Company, Seattle, Wash., a corporation of Delaware
Filed Feb. 4, 1964, Ser. No. 342,481
1 Claim. (Cl. 105—369)

This invention relates to a securing device and more particularly to a device having a female portion mounted to a floor in combination with an internally threaded nut which may be nonrotatably engaged with the female portion.

Aircraft cargo tie-down devices which may be converted to a passenger seat or equipment securing device are well known in the art. A particularly useful device in the prior art consists of a flush mounted female portion adapted to accept a cargo or a passenger seat stud. In securing heavy equipment to the floor, however, prepositioning of threaded studs in the female portions requires lifting and careful alignment of the equipment to be secured in order to fit it onto the studs.

It is an object of this invention, therefore, to provide a device having a female portion which fits flush with the floor and is adapted to receive means for accepting a threaded stud which is easily locked in position in said female portion and prevented from rotating therein without the application of any separate tool, such as a wrench; the female portion having means to close the aperture into which the internally threaded means is inserted when the device is not in use or after the nut is inserted.

The drawings diagrammatically illustrate by way of example, not by way of limitation, one form of the invention which comprises several novel features hereinafter set forth wherein like reference numerals designate corresponding parts in the several views in which:

FIG. 1 is a plan view of the female portion of the device;

FIG. 2 is a vertical section of the female portion shown in FIG. 1;

FIG. 3 is a side elevation of the female portion shown in FIG. 1;

FIG. 4 is a perspective view of one form of a cylindrical part of nut;

FIG. 5 is a plan view of the nut shown in FIG. 4;

FIG. 6 is a side elevation of the nut shown in FIG. 4;

FIG. 7 is a vertical section of the device being assembled;

FIG. 8 is a vertical section of the device fully assembled; and

FIG. 9 is a plan view of the assembled device.

Referring to FIGURE 1, a female portion 20 of a securing device assembly is shown bolted to a floor 21 by means of screws 22. The female portion 20 has a plate 23 which is mounted flush with floor 21 and has a keyhole shaped aperture or slot 24 located therein. The aperture 24 has an enlarged or circular portion 25 and a narrow or slotted portion 26. A housing or supporting structure 27 is carried by plate 23 and is provided with a guide hole 28 extending through the housing floor below the circular portion 25 of the keyhole 24 and a second guide hole 29 in the housing floor beneath the slotted portion 26. Guide holes 28 and 29 carry first and second resiliently mounted means comprising piston rods 30 and 31, respectively, having piston heads 32 and 33, respectively. Piston heads 32 and 33 flushly fit keyhole portions 25 and 26, respectively, when in their extended or raised position. Piston head 33 has means for engaging first resiliently mounted means comprising tab 34 which extends below piston head 32 so that downward movement or retraction of piston head 32 cause like movement of head 33. Springs 35 and 36 are concentrically mounted around piston rods 30 and 31, respectively, and are seated on the bottom of housing 27 so as to normally urge piston heads 32 and 33 upward into the keyhole 24. The top of piston head 32 is provided with a slot 37 for a screwdriver; the side of head 32 has longitudinal movement limiting means comprising pin 38 mounted therein for engaging a slot 39 formed in housing 27. Slot 39 has a vertical longitudinally extending portion 40 and a circumferential portion 41 as shown in FIGURE 3. Portion 41 has an enlarged circular portion 42 in which pin 38 may move upward due to the bias of springs 35 and 36 so as to be retained in this enlarged portion 42. The male portion of the securing device, i.e. means for accepting a threaded stud, shown in FIGURES 4 through 6, consists of an internally threaded nut or cylindrical part 43 having a diameter 44 smaller than the diameter of the keyhole enlarged portion 25 and larger than the width of the keyhole slotted portion 26. Nut 43 has means to prevent rotation of said nut 43 relative to plate 23 comprising axial projection or key 45 having a height approximately equal to the thickness of plate 23. The width of key 45 is designed so that it may project into the keyhole slotted portion 26 in close fitting relation therewith. The close tolerance fit is provided by parallel sides 46 of the key which are contiguous to the sides 47 of the slotted portion 26 when key 45 projects therein.

The keyhole slot 24 is filled by piston heads 32 and 33 in their extended position due to urging of springs 35 and 36 when the device is not being used. The extended position of the piston heads 32 and 33 is limited by pin 38 which has reached the top of slot 40 and in that position the tops of the piston heads are flush with the upper surface of plate 23 so as to prevent any foreign particles from entering into the housing 27. To insert the nut 43 into the female portion 20, two methods may be used. A screwdriver may be inserted in slot 37 and a downward force applied to overcome the bias of springs 35 and 36 thereby moving pin 38 to the bottom of slot 40 wherein a torque applied on the screwdriver will force the pin into the slot 41 and finally into enlarged portion 42 where it will be retained. Nut 43 may then be inserted into keyhole circular portion 25 with key 45 in the upper position and nearest to enlarged portion 25. By aligning sides 46 of the nut with the parallel sides of the slotted portion 26, the nut may be laterally moved into this slotted portion. A screwdriver may then be used to release pin 38 from the slot 41 so that piston head 32 will project into circular portion 25 while piston head 33 will urge nut 43 against the lower surface of plate 23. A second method, as shown best in FIGURE 7, is to partially insert a bolt 48 into the nut 43 so as to facilitate the application of a downward force on head 32. Depression of head 32, and simultaneously therewith head 33, allows the nut 43 and bolt 48 to be moved into slotted portion 26 when sides 46 are aligned with the sides of the slotted portion. When nut 43 slides off head 32, it will snap up to its extended position filling circular portion 25. The nut will be urged against the lower surface of plate 23 by the bias of spring 36. Bolt 48 may then be extracted and the device is assembled.

Whichever method is used to assemble the device, it is readily seen that nut 43 is prevented from moving out of slotted portion 26 by the position of piston head 32. The nut 43, furthermore, is prevented from rotating so that a bolt may be tightly threaded therein to secure equipment, such as angle plate 49. The close fit between parallel sides 46 and slotted portion 26 prevents the key 45 from turning in the slot and therefore the nut 43 cannot rotate.

It may now be understood that the use of a nut 43 in the female portion 20 provides a device which has a face flush with the floor and therefore equipment may be easily slid over the device, aligned and bolted down to the floor.

While there has been shown and described the fundamental novel features of this invention as applied to the preferred embodiment, it will be understood that omissions, substitutions and changes in form and details of the device illustrated may be made by those skilled in the art without departing from the scope of the invention. It is the intention therefore to be limited only by the scope of the following claim and reasonable equivalents thereof.

I claim:

In a securing device comprising: a plate adapted to be mounted flushly to a floor, said plate having an aperture having a first aperture portion and a second aperture portion connecting thereto and having a width smaller than that of said first aperture portion, a housing carried by said plate beneath said aperture, a first member resiliently mounted in said housing and positioned in alignment with the first aperture portion, a second member resiliently mounted in said housing and positioned in alignment with the second aperture portion, resilient means in said housing to urge each of said first and second members upwardly to close said first aperture portion and said second aperture portion, respectively, projecting means on at least one of said first and second members to depress said second member upon depression of said first member, and a limit stop to position said first member with its surface generally flush with that of the plate; the improvement comprising, in combination with said securing device, an internally threaded nut member having a diameter smaller than the width of said first aperture portion but larger than the width of said second aperture portion, said nut having an axial projection having a height no greater than the approximate width of the plate at said aperture, and a width less than that of said second aperture portion, said projection being spaced radially from the threaded portion of said nut and located adjacent to two upwardly facing, plate engaging shoulder portions of said nut, but out of alignment with said shoulder portions, so that said projection is able to fit in said second aperture portion at a location therein spaced longitudinally along said second aperture portion from the location of the threaded portion of the nut, with the shoulder portions of the nut bearing upwardly against the lower portion of said plate, whereby said nut can be inserted through said larger aperture portion and moved laterally to a location above said second member, with the result that the shoulder portions of said nut are pressed by said second member against the lower surface of said plate, with said projection reaching into said narrower aperture portion to prevent rotation of said nut.

References Cited by the Examiner

UNITED STATES PATENTS

| | | | |
|---|---|---|---|
| 984,647 | 2/1911 | Carlson | 52—710 |
| 1,409,524 | 3/1922 | Chase | 52—711 |
| 1,769,498 | 7/1930 | Downing | 52—709 |
| 1,820,064 | 8/1931 | Green. | |
| 2,786,428 | 3/1957 | Arnold | 105—369 |

ARTHUR L. LA POINT, *Primary Examiner.*

DRAYTON E. HOFFMAN, *Examiner.*